United States Patent
Park

(10) Patent No.: US 9,995,599 B2
(45) Date of Patent: Jun. 12, 2018

(54) ROTATING SENSING APPARATUS INCLUDING A SENSING PLATE WITH HOLES AND A SENSING MAGNET

(71) Applicant: LG INNOTEK CO., LTD., Seoul (KR)

(72) Inventor: Jae Hyun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 231 days.

(21) Appl. No.: 14/109,147

(22) Filed: Dec. 17, 2013

(65) Prior Publication Data
US 2014/0167743 A1 Jun. 19, 2014

(30) Foreign Application Priority Data
Dec. 17, 2012 (KR) .................. 10-2012-0147320

(51) Int. Cl.
| | |
|---|---|
| *G01D 5/14* | (2006.01) |
| *H02K 11/21* | (2016.01) |
| *H02K 11/215* | (2016.01) |
| *H02K 11/22* | (2016.01) |

(52) U.S. Cl.
CPC ............ *G01D 5/145* (2013.01); *H02K 11/21* (2016.01); *H02K 11/215* (2016.01); *H02K 11/22* (2016.01)

(58) Field of Classification Search
CPC ...... G01D 5/145; H02K 11/21; H02K 11/215; H02K 11/22
USPC ............................................ 324/207.25, 226
See application file for complete search history.

(56) References Cited

U.S. PATENT DOCUMENTS

| | | | | |
|---|---|---|---|---|
| 4,358,735 A | * | 11/1982 | Boys ................ | B25B 23/14 324/173 |
| 5,631,508 A | * | 5/1997 | Cho ................. | G11B 19/00 310/156.34 |
| 5,717,268 A | * | 2/1998 | Carrier ............. | G01P 3/487 310/156.06 |

(Continued)

FOREIGN PATENT DOCUMENTS

| | | |
|---|---|---|
| CN | 1992479 A | 7/2007 |
| CN | 102288210 A | 12/2011 |

(Continued)

OTHER PUBLICATIONS

Masabumi et al, JP2001025212, (English Machine Translation), Published Jan. 26, 2001.*

(Continued)

*Primary Examiner* — Jay Patidar
(74) *Attorney, Agent, or Firm* — Saliwanchik, Lloyd & Eisenschenk

(57) ABSTRACT

A motor includes a rotating shaft, a rotor that surrounds the rotating shaft, rotates along with the rotating shaft, and includes a drive magnet, and a sensing unit that surrounds the rotating shaft, is disposed over the rotor, and detects rotation of the rotor, wherein the sensing unit includes a sensing plate that includes a plurality of holes that are formed along with an edge of the sensing plate, a sensing magnet that is mounted on the sensing plate and is disposed closer to the rotating shaft than the plurality of holes, a first sensor that is disposed over the sensing plate and detects a change in the sensing plate, and a second sensor that is disposed over the sensing magnet and detects a change in the sensing magnet.

8 Claims, 5 Drawing Sheets

(56) References Cited

U.S. PATENT DOCUMENTS

| | | | | |
|---|---|---|---|---|
| 5,900,709 | A * | 5/1999 | Kanda | G05B 1/06 318/400.12 |
| 6,727,627 | B1 * | 4/2004 | Sasaki | H02K 21/46 310/156.53 |
| 2002/0089324 | A1 * | 7/2002 | Miyata | G01D 5/145 324/207.2 |
| 2011/0298411 | A1 * | 12/2011 | Yoshida | G01D 5/3473 318/640 |
| 2014/0035496 | A1 * | 2/2014 | Mizuo | H02P 23/005 318/400.17 |

FOREIGN PATENT DOCUMENTS

| | | |
|---|---|---|
| DE | 4243778 A1 | 6/1994 |
| DE | 10-2009-020570 A1 | 11/2010 |
| EP | 2682716 A2 | 1/2014 |
| JP | S59-127557 A | 7/1984 |
| JP | S60-176439 A | 9/1985 |
| JP | 03-082359 A | 4/1991 |
| JP | 08-029201 A | 2/1996 |
| JP | H08-29201 B2 | 2/1996 |
| JP | H08-205479 A | 8/1996 |
| JP | 2001-025212 A | 1/2001 |
| JP | 2007-135258 A | 5/2007 |
| JP | 2014-013163 A | 1/2014 |

OTHER PUBLICATIONS

Toru et al, JPH0829201, (English Machine Translation), Published Feb. 2, 1996.*
Partial European Search Report dated Jun. 19, 2017 in European Application No. 13197223.4.
Chinese Office Action dated Mar. 3, 2017 in Chinese Application No. 201310693742.2, along with its English translation.
Japanese Office Action dated Nov. 21, 2017 in Japanese Application No. 2013-259864.

* cited by examiner

ROTATING SENSING APPARATUS INCLUDING A SENSING PLATE WITH HOLES AND A SENSING MAGNET

CROSS-REFERENCE TO RELATED APPLICATION

This application claims the benefit under 35 U.S.C. § 119 Korean Patent Application No. 10-2012-0147320, filed on Dec. 17, 2012, which is incorporated herein by reference in its entirety.

BACKGROUND

Field of the Invention

The present invention relates to a motor, and more particularly, to a sensing unit of a motor.

Discussion of Related Art

In general, a motor includes a rotating shaft, a rotor that surrounds the rotating shaft, a stator that is spaced a predetermined interval from the rotor, and a housing that fixes the stator.

The rotating shaft may be supported by the housing. The rotor includes a rotor core that surrounds the rotating shaft and a drive magnet that is coupled to the rotor core. The stator includes a plurality of stator cores and coils that are wound around each of the stator cores. When current is applied to the stator, the rotor rotates due to interaction between the stator and the rotor.

The motor may include a sensor and a sensing magnet for detecting the amount of rotation of the motor. The sensing magnet is generally magnetized on an inner race, and includes main poles that are arranged to correspond to those of the drive magnet and frequency generator (FG) poles that are magnetized on an outer race and are arranged more densely than the main poles.

Accordingly, a rotation angle of the motor may be accurately measured, and the motor may be softly driven. However, magnetic flux interference between the main poles and the FG poles may occur, thereby leading to waveform distortion.

Although a dummy track may be disposed between the main poles and the FG poles, there is a limitation on a size of the sensing magnet, and thus it is difficult to secure sufficient space for the dummy track.

BRIEF SUMMARY

The present invention is directed to a structure of a sensing unit of a motor.

According to an aspect of the present invention, there is provided a motor including: a rotating shaft; a rotor that surrounds the rotating shaft, rotates along with the rotating shaft, and includes a drive magnet; and a sensing unit that surrounds the rotating shaft, is disposed over the rotor, and detects rotation of the rotor, wherein the sensing unit includes: a sensing plate that includes a plurality of holes that are formed along with an edge of the sensing plate; a sensing magnet that is mounted on the sensing plate and is disposed closer to the rotating shaft than the plurality of holes; a first sensor that is disposed over the sensing plate and detects a change in the sensing plate; and a second sensor that is disposed over the sensing magnet and detects a change in the sensing magnet.

The first sensor may be an optical sensor, and the second sensor may be a Hall integration chip (IC).

The drive magnet may be configured such that N poles and S poles are alternately arranged around the rotor, and the sensing magnet may include a plurality of poles that are arranged to correspond to poles of the drive magnet.

A number of the plurality of holes of the sensing plate may be greater than a number of N poles or S poles of the sensing magnet.

According to another aspect of the present invention, there is provided a motor including: a rotating shaft; a rotor that surrounds the rotating shaft, rotates along with the rotating shaft, and includes a drive magnet; and a sensing unit that surrounds the rotating shaft, is disposed over the rotor, and detects rotation of the rotor, wherein the sensing unit includes: a sensing plate that includes a plurality of first holes that are formed along with an edge of the sensing plate and a plurality of second holes that are formed closer to the rotating shaft than the plurality of first holes to surround the rotating shaft; and first and second sensors that are respectively disposed over the plurality of first and second holes and detect a change in the sensing plate.

The first and second sensors may be optical sensors.

The drive magnet may be configured such that N poles and S poles are alternately arranged around the rotor, wherein the plurality of second hole are formed to correspond to the N poles or S poles of the drive magnet.

A number of the plurality of first holes may be greater than a number of the plurality of second holes.

According to another aspect of the present invention, there is provided a sensing unit including: a sensing plate that surrounds a rotating shaft and includes a plurality of holes that are formed includes edge of the sensing plate; a sensing magnet that is mounted on the sensing plate and is disposed closer to the rotating shaft than the plurality of holes; a first sensor that is disposed over the sensing plate and detects a change in the sensing plate; and a second sensor that is disposed over the sensing magnet and detects a change in the sensing magnet.

According to another aspect of the present invention, there is provided a sensing unit including: a sensing plate that surrounds a rotating shaft and includes a plurality of first holes that are formed along with an edge of the sensing plate and a plurality of second holes that are formed closer to the rotating shaft than the plurality of first holes to surround the rotating shaft; and first and second sensors that are respectively disposed over the plurality of first and second holes and detect a change in the sensing plate.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
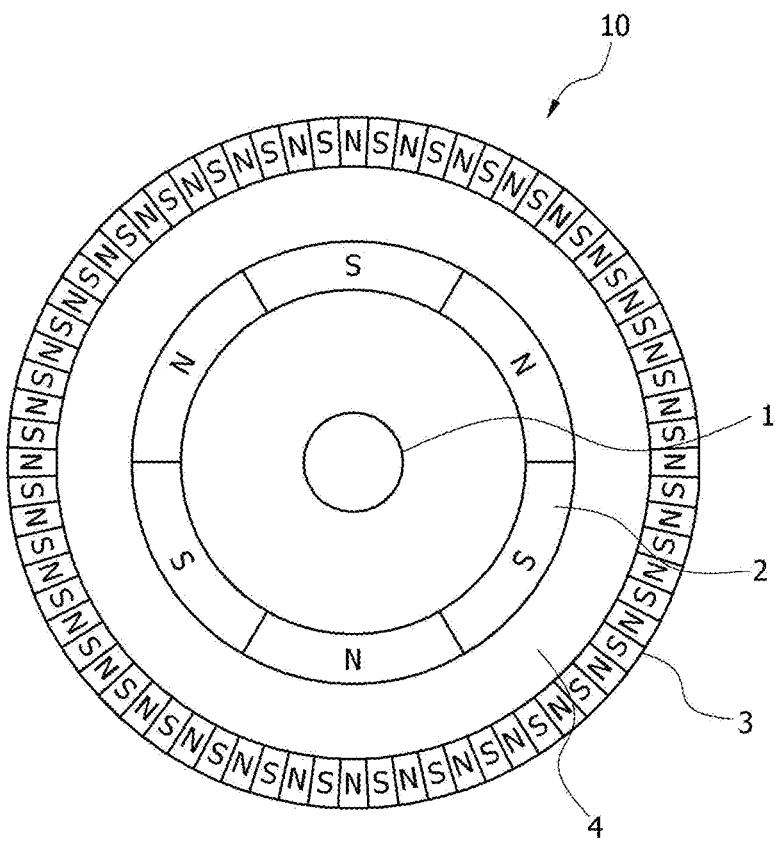
FIG. 1 is a view illustrating a sensing magnet according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms first, second, third etc. may be used herein to describe various elements, these elements should not be limited by these terms. These terms are only used to distinguish one element from another element. Thus, a first element discussed below could be termed a second element and, similarly, a second element could be termed a first element without departing from the teachings of exemplary embodiments. As used herein, the term "and/or," includes any and all combinations of one or more of the associated listed items.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element, there are no intervening elements.

The terminology used herein is for the purpose of describing particular embodiments only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings, in which exemplary embodiments of the present invention are shown. In the drawings, the same elements are denoted by the same reference numerals and a repeated explanation thereof will not be given.

Figure 2:
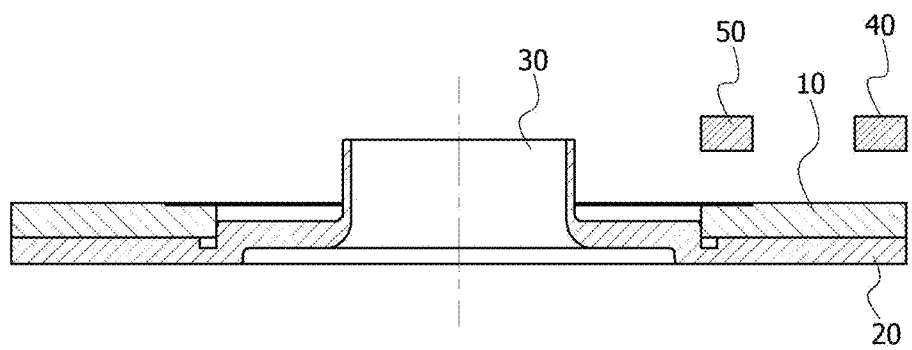
FIG. 2 is a partial cross-sectional view illustrating a motor on which the sensing magnet of FIG. 1 is magnetized.

FIG. 1 is a view illustrating a sensing magnet 10. FIG. 2 is a partial cross-sectional view illustrating a motor on which the sensing magnet 1 of FIG. 1 is magnetized.

Referring to FIG. 1, the sensing magnet 10 has a disk shape, and a through-hole 1 through which a rotating shaft 30 may pass is formed in a central portion of the sensing magnet 10.

The sensing magnet 10 includes main poles 2 that are arranged adjacent to the through-hole 1 in a circumferential direction and frequency generator (FG) poles 3 that are formed on an edge of the sensing magnet 10.

The main poles 2 include a plurality of poles that are arranged to correspond to those of a drive magnet that is inserted into a rotor of the motor. The FG poles 3 are arranged more densely than the main poles 2 and thus include more poles than the main poles 2. Accordingly, a rotation angle may be more accurately separately measured, and the motor may be more softly driven.

Referring to FIGS. 1 and 2, the sensing magnet 10 is mounted on the sensing plate 20, and the sensing plate 20 surrounds the rotating shaft 30. Although not shown in FIGS. 1 and 2, the sensing plate 20 is disposed over the rotor that surrounds the rotating shaft 30 and rotates along with the rotating shaft 30.

Hall integration chips (ICs) 40 and 50 are respectively disposed over the FG poles 3 that correspond to an outer race of the sensing magnet 10 and the main poles 2 that correspond to an inner race of the sensing magnet 10, and detect a change in a magnetic flux as the sensing magnet 10 rotates. The Hall ICs 40 and 50 detect rotation of the rotor by transmitting a detection signal to an electronic control unit (ECU).

In this structure, magnetic flux interference occurs between the main poles 2 and the FG poles 3, thereby leading to waveform distortion. Although magnetic flux interference may be reduced by disposing a dummy track 4 between the main poles 2 and the FG poles 3, there is a limitation on a size of the sensing magnet 10, and thus it is difficult to secure sufficient space for the dummy track 4.

Alternatively, waveform distortion due to magnetic flux interference may be inhibited by removing the FG poles 3 that correspond to the outer race of the sensing magnet 10.

Figure 3:
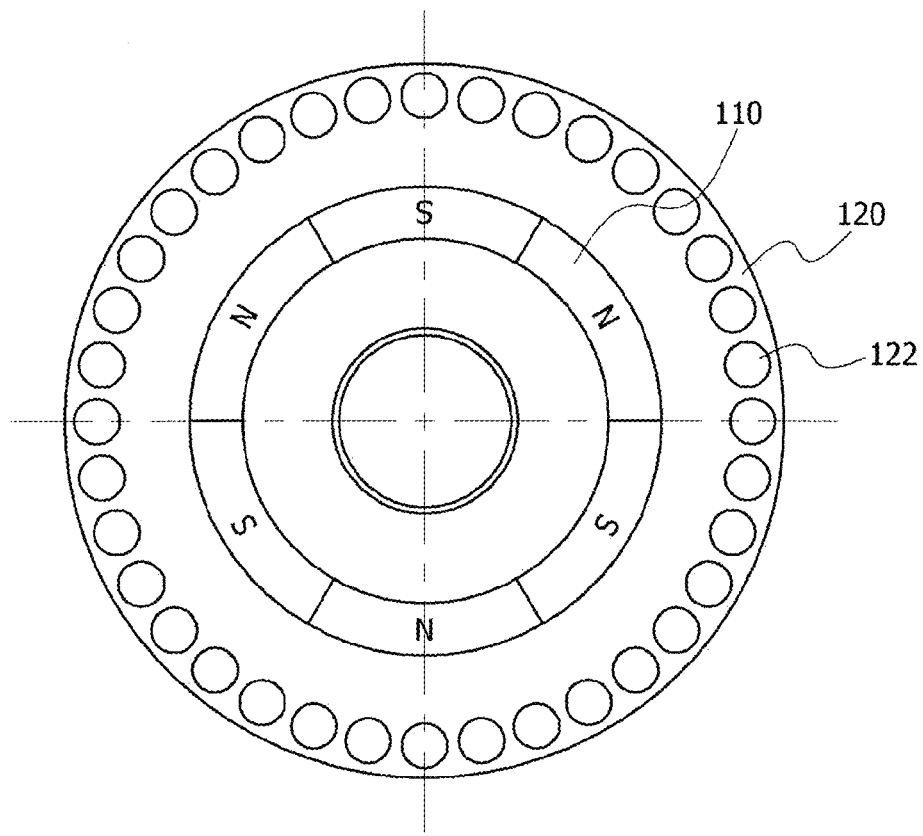
FIG. 3 is a view illustrating a sensing magnet and a sensing plate according to another embodiment of the present invention.
Figure 4:
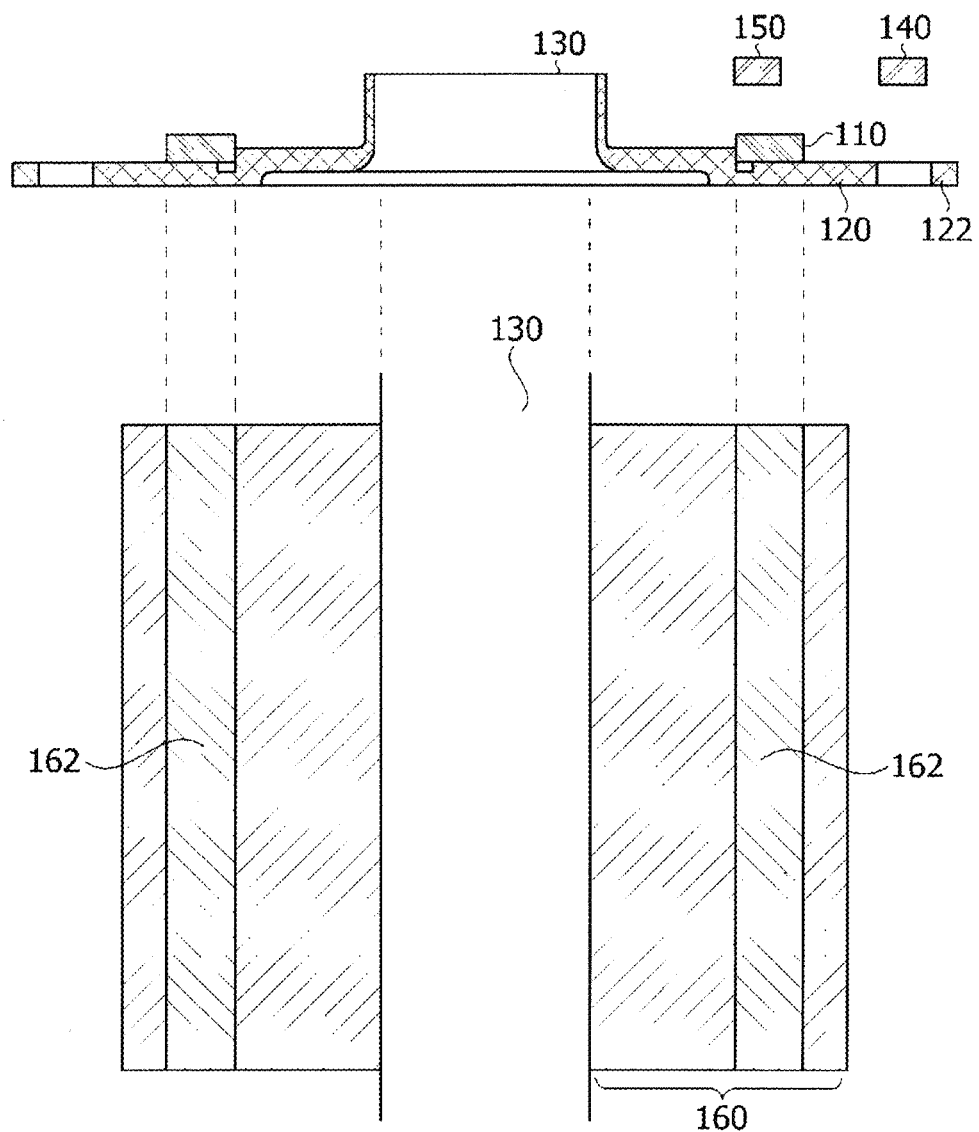
FIG. 4 is a partial cross-sectional view illustrating a motor including the sensing magnet and the sensing plate of FIG. 3.

FIG. 3 is a view illustrating a sensing magnet 110 and a sensing plate 120, according to another embodiment of the present invention. FIG. 4 is a partial cross-sectional view illustrating a motor including the sensing magnet 110 and the sensing plate 120 of FIG. 3.

Referring to FIG. 3, the sensing magnet 110 includes main poles that are arranged adjacent to a through-hole in a circumferential direction. The main poles include a plurality of poles that are arranged to correspond to those of a drive magnet that is inserted into a rotor (not shown) of the motor. That is, the drive magnet is configured such that N poles and S poles are alternately arranged around the rotor, and a plurality of poles of the sensing magnet 110 are arranged to correspond to the N poles and the S poles of the drive magnet.

The sensing magnet 110 is mounted on the sensing plate 120, and a plurality of holes 122 are formed along with an edge of the sensing plate 120. The number of the holes 122 is greater than the number of the N poles or the S poles of the sensing magnet 110.

Referring to FIGS. 3 and 4, the sensing magnet 110 is mounted on the sensing plate 120, and the sensing plate 120 surrounds a rotating shaft 130. The rotor 160 that rotates along with the rotating shaft 130 and includes the drive magnet 162 surrounds the rotating shaft 130, and the sensing plate 120 is disposed over the rotor 160. Sensors 140 and 150 that respectively detect a change in the sensing plate 120 and the sensing magnet 110 are respectively disposed over the sensing plate 120 and the sensing magnet 110.

The sensing magnet 110, the sensing plate 120, and the sensors 140 and 150 may be collectively referred to as a sensing unit.

The sensing magnet 110 is disposed closer to the rotating shaft 130 than the holes that are formed in the sensing plate 120.

The sensor 140 is disposed over the holes 122 that are formed in the sensing plate 120, and detects a change in the sensing plate 120. The sensor 140 may be an optical sensor that detects light passing through the holes 122. The optical sensor may be, for example, a tachometer.

The sensor 150 is disposed over the sensing magnet 110, and detects a change in a magnetic flux of the sensing magnet 110. To this end, the sensor 150 may be a Hall IC.

As such, the plurality of holes 122 formed in the sensing plate 120 function as the FG poles 3 of the sensing magnet 10 of FIG. 1. Accordingly, a rotation angle of the motor may be accurately measured while inhibiting magnetic flux interference between main poles and FG poles.

Alternatively, waveform distortion due to magnetic flux interference may be inhibited by removing the sensing magnet 110.

Figure 5:
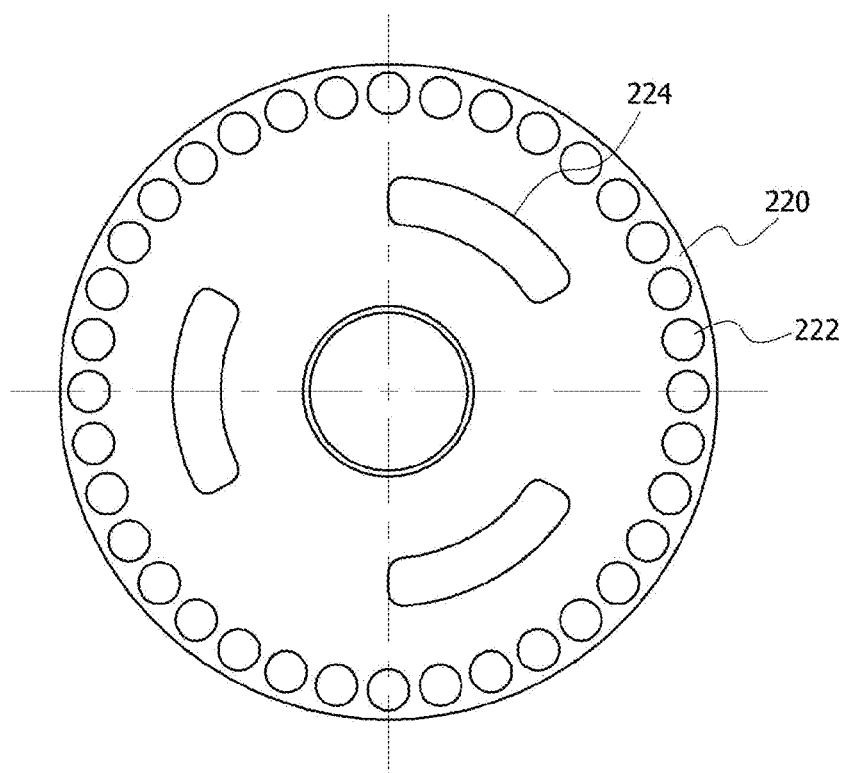
FIG. 5 is a view illustrating a sensing plate according to another embodiment of the present invention.
Figure 6:
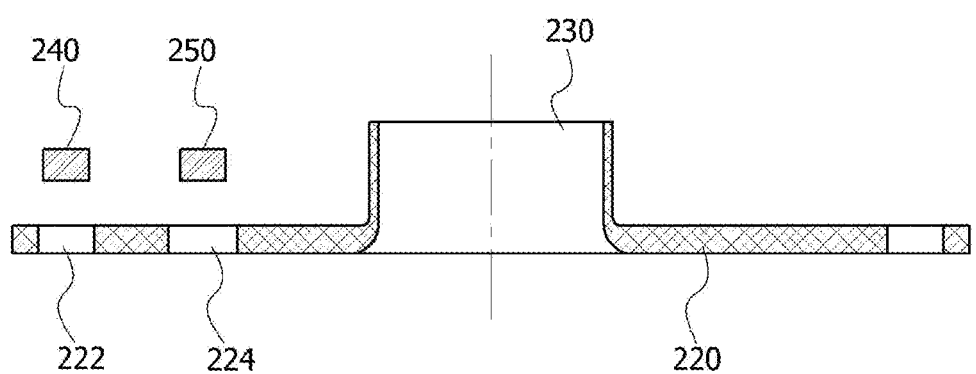
FIG. 6 is a partial cross-sectional view illustrating a motor including the sensing plate of FIG. 5.

FIG. 5 is a view illustrating a sensing plate 220 according to another embodiment of the present invention. FIG. 6 is a partial cross-sectional view illustrating a motor including the sensing plate 220 of FIG. 5.

Referring to FIG. 5, the sensing plate 220 has a through-hole through which a rotating shaft 230 may pass, and has a disk shape.

A plurality of holes 222 are formed along with an edge of the sensing plate 220. A plurality of holes 224 are formed closer to the rotating shaft 230 than the holes 222 in a circumferential direction to surround the rotating shaft 230. The holes 224 are formed to correspond to poles of a drive magnet that is inserted into a rotor of the motor. That is, the drive magnet is configured such that N poles and S poles are alternately arranged around the rotor, and the holes 224 are arranged to correspond to the N poles or the S poles of the drive magnet. The number of the holes 222 may be greater than the number of the holes 224.

Referring to FIGS. 5 and 6, the sensing plate 220 surrounds the rotating shaft 230. Although not shown in FIGS. 5 and 6, the rotor that rotates along with the rotating shaft 230 and includes the drive magnet surrounds the rotating shaft 230, and the sensing plate 220 is disposed over the rotor. Sensors 240 and 250 that detect a change in the sensing plate 220 are respectively disposed over the holes 222 and 224 of the sensing plate 220.

The sensing plate 220 and the sensors 240 and 250 may be collectively referred to as a sensing unit.

The sensor 240 is disposed over the holes 222 that are formed along with the edge of the sensing plate 220, and detects a change in the sensing plate 220. The sensor 250 is disposed over the holes 224 that are formed closer to the rotating shaft 230 than the holes 222 to surround the rotating shaft 230, and detects a change in the sensing plate 220. To this end, the sensors 240 and 250 may be optical sensors that detect light passing through the holes 222 and 224. The optical sensors may be, for example, tachometers.

As such, the holes 222 that are formed in the sensing plate 220 may function as the FG poles 3 of the sensing magnet 10 of FIG. 1, and the holes 224 may function as the main poles 2 of the sensing magnet 10 of FIG. 1. Accordingly, a rotation angle of the motor may be accurately measured while inhibiting magnetic flux interference between main poles and FG poles.

Figure 7:
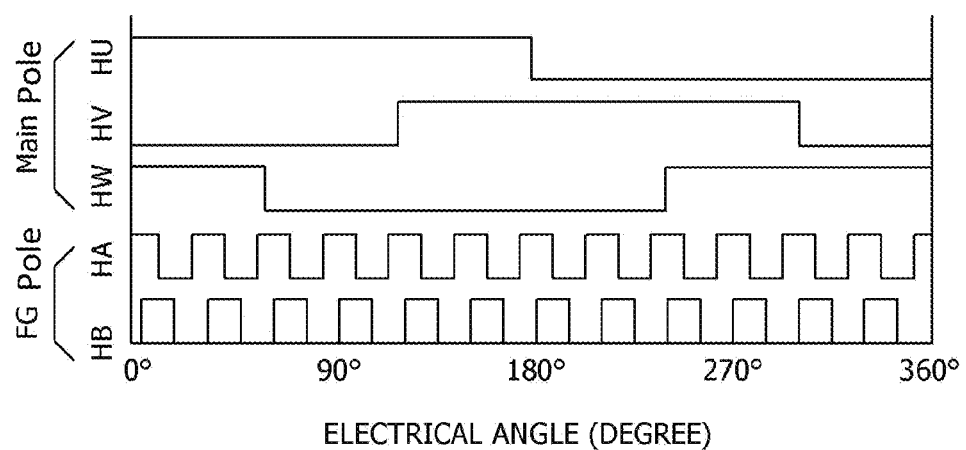
FIG. 7 is a graph illustrating a waveform output from a sensing unit, according to an embodiment of the present invention.

FIG. 7 is a graph illustrating a waveform output from a sensing unit, according to an embodiment of the present invention. In the sensing unit of FIG. 3, a Hall IC for the sensing magnet 110 may output 1 (On) at N poles and may output 0 (Off) at S poles, and an optical sensor for holes of the sensing plate 120 may output 1 (On) when light is reflected and may output 0 (Off) when light is not reflected. In the sensing unit of FIG. 5, an optical sensor for holes (corresponding to main poles) formed on an inner race of the sensing plate 220 and an optical sensor for holes (corresponding to FG poles) formed on an outer race of the sensing plate 220 may output 1 (On) when light is reflected and may output 0 (Off) when light is not reflected.

As such, rotation of the motor may be detected with the same detection effect as that obtained by using a magnet and a Hall IC while inhibiting waveform distortion.

According to the one or more embodiments of the present invention, waveform distortion due to interference between main poles and FG poles of a sensing magnet may be inhibited. Costs may be reduced by entirely or partially removing the sensing magnet.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A sensing unit comprising:
   a sensing plate that surrounds a rotating shaft, is disposed over a rotor, and comprises a plurality of holes that are formed along an edge of the sensing plate, wherein each hole of the plurality of holes has a circle shape having the same diameter, wherein a distance between the center of each hole of the plurality of holes and the center of the sensing plate is the same, and wherein the plurality of holes are disposed at the same interval;
   a sensing magnet that is disposed to contact an upper surface of the sensing plate and is disposed closer to the rotating shaft than are the plurality of holes;
   a first sensor that is disposed over the holes and detects light passing through the holes; and
   a second sensor that is disposed over the sensing magnet and detects a change of magnetic flux in the sensing magnet,
   wherein the sensing magnet comprises a plurality of N poles and a plurality of S poles arranged in an alternating fashion,
   wherein the plurality of N poles and the plurality of S poles are arranged adjacent to a through-hole in a circumferential direction,
   wherein the number of holes is greater than a sum of the number of N poles and the number of S poles,
   wherein the number of holes is a multiple of the number of N poles and S poles,
   wherein the plurality of N poles and the plurality of S poles function as main poles that are arranged to correspond to poles of a drive magnet that is inserted into the rotor, and
   wherein the plurality of holes function as frequency generator (FG) poles.

2. The sensing unit of claim 1, wherein the first sensor is an optical sensor, and the second sensor is a Hall integration chip (IC).

3. A motor comprising the sensing unit according to claim 1.

4. The sensing unit of claim 1, wherein the number of holes is 6 times the total number of N poles and S poles.

5. The sensing unit of claim 4, wherein the number of holes is 36, and the total number of N and S poles is 6.

6. The sensing unit of claim 1, wherein the first sensor outputs an "On" signal when light is reflected and outputs an "Off" signal when light is not reflected, and wherein the second sensor outputs the "On" signal at each N pole and the "Off" signal at each S pole.

7. The sensing unit of claim 6, wherein the number of "On" signals, which the first sensor outputs, is a multiple of the number of "On" signals, which the second sensor outputs.

8. The sensing unit of claim 7, wherein the first sensor outputs 6 "On" signals and the second sensor outputs 1 "On" signal.

* * * * *